Figure 1:
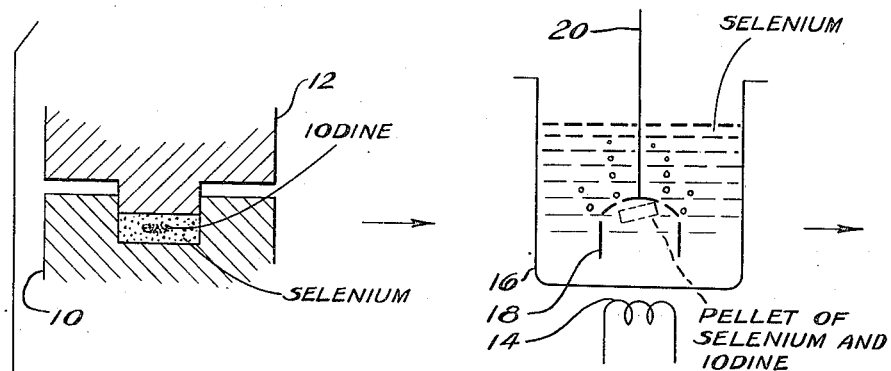
Figure 1:
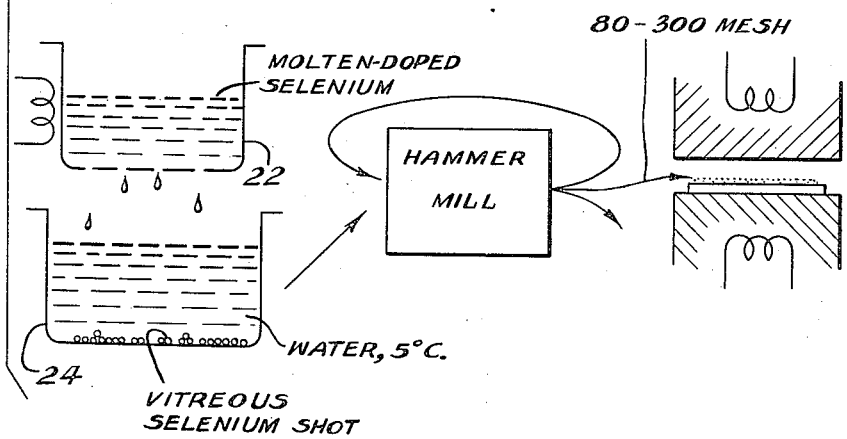

United States Patent Office 2,766,210
Patented Oct. 9, 1956

2,766,210

MANUFACTURE OF SELENIUM ELEMENTS

Frederic Koury, Somerville, and Benjamin P. Hecht, Dorchester, Mass., assignors to Sylvania Electric Products Inc., a corporation of Massachusetts Application May 6, 1949, Serial No. 91,664

6 Claims. (Cl. 252—62.3)

The present invention relates to methods of making asymmetrically conductive selenium elements, particularly to the manufacture of selenium rectifiers, and to materials used in their manufacture.

In selenium rectifiers, a layer of doped selenium is supported on a carrier electrode, covered by a counter-electrode, and is generally believed to be separated from the counterelectrode by a barrier layer. In known preliminary steps, the purified selenium is "doped" while being heated above melting temperature of both the pure selenium and the doping constituent. After cooling, the doped selenium is reduced to coarse granules, and is commonly applied as a layer to the carrier electrode under heat and pressure. Subsequent treatment of the applied layer by heat and/or reagents, followed by application of the counterelectrode and usually by electroforming, completes the rectifier.

The use of a fractional percentage of a volatile doping substance such as iodine or various iodides has heretofore been proposed for reducing the forward resistance of the element, but irregular performance and mediocre efficiencies have induced resort to more complex methods of manufacturing rectifiers utilizing other doping materials adaptable to such alternative methods.

The present invention provides a method of preparing the selenium layer forming part of an asymmetrically conductive element. Especially as applied to selenium rectifiers, the further processing is simplified, and a product of outstanding efficiency and uniformity is obtained.

In the preferred form of the invention, a small charge of iodine as the volatile doping constituent is trapped within a selenium pellet, by molding the iodine at the center of a much larger charge of selenium powder under great pressure but without heating the mold. The pellet is then immersed in a larger quantity of molten selenium, the pellet being maintained well below the surface of the liquid selenium so that, before excessive, unknown amounts of the volatile constituent can escape from the selenium, it goes thoroughly into solution. Iodine as the doping constituent may even combine with the selenium in predetermined proportions, by virtue of the procedure described.

The preliminary heating of the molten selenium produces a preponderance of small selenium molecules such as Se₂ that we conceive to be important in achieving rectifiers of superior efficiency. The small molecules are believed important to a fine crystalline structure in the selenium layer that is formed later, and to the low forward resistivity of the resulting product. The small molecule size is preserved in the preferred practice of this invention without loss of control of the volatile constituent of the selenium, by first chilling small drops of selenium as shot; and the shot is then comminuted, significantly in a fracturing operation that is controlled to produce particles within a definite range of sizes. The particles are applied to the carrier electrode under heat well below the melting temperature and under great pressure, after which the selenium surface is treated in accordance with any desirable process, and the element finally is completed in any desired way.

Figure 2:
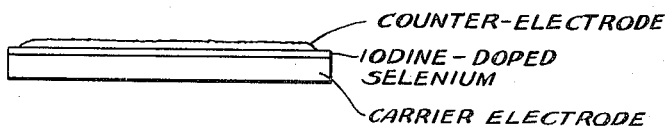

The invention will be better appreciated, and further features of novelty will be noted from the following detailed disclosure of an illustrative procedure shown diagrammatically in the accompanying drawings, in which:

Fig. 1 is a diagram illustrating the sequence of operations in the preparation and application of selenium to a carrier electrode; and Fig. 2 is a lateral view of a completed selenium rectifier.

Doping constituents are used in selenium devices to reduce the resistivity of the selenium layer in the low-resistance or forward direction of electric current. We have found 0.15 gram of iodine per 1000 grams of selenium to give optimum results. Other halogens and halogen compounds soluble in selenium, including chlorine, bromine, and selenium halides and oxyhalides, produce comparable effects in this respect, and involve like processing problems.

A preferred method of preparing granules of best physical characteristics and of the desired composition for application to the carrier electrode is illustrated in Fig. 1. Several grams of selenium powder (prepared specially, as will appear) are charged into the lower half 10 of an unheated mold. The full iodine charge for a kilogram batch of selenium to be doped is next deposited on the selenium layer at its center, and this is covered by additional selenium powder. The upper mold 12 applies pressure of the order of 2,000 pounds per square inch to the selenium and iodine powders for about one minute, and the pellet produced is ejected. With due allowance for the quantity of selenium in the pellet (about 5 grams) an additional quantity of selenium, to make up the required batch proportions, is heated as by coil 14 in an inert vessel 16 as of quartz, maintained at 400° C. to 450° C. for five to ten minutes. This is for the purpose of driving off unwanted and uncontrolled amounts of volatile impurities that may be included in the commercially pure selenium as it is supplied, and for the further purpose of minimizing the size of the molecules of selenium. The pellet is then immersed in the liquid selenium by an inverted, perforated vessel 18 of suitable glass or like material having a rod 20 emerging from the liquid for agitating the liquid selenium, and the melting pellet and the iodine vapors escaping from the pellet.

The agitation is continued briefly, about 1½ minutes, to insure uniform dispersion of the iodine throughout the selenium batch. This is then poured into an externally heated vessel 22 of glass or other suitable inert material, having a perforated bottom supported close to the surface of another vessel 24 containing water maintained at approximately 5° C. as by Dry Ice. By causing the selenium to reach the water as fine drops or a fine stream dropping through a short distance, and by sudden chilling, the solidified selenium is obtained as fine vitreous shot. Selenium molecules of minimum size and maximum number thus are preserved so as to promote a large number of crystal nuclei that we believe to be important in the subsequent heat-treatment of the applied selenium layer. Stringy selenium after chilling is to be avoided.

The vitreous shot properly produced is removed from the water, dried, flushed with a water-miscible highly volatile solvent such as ethyl or methyl alcohol, and thoroughly dried. The shot is next reduced in a hammer mill to particle sizes between 80 and 300 mesh. The hammer mill is effective to fracture and shatter the shot, reducing it to a very fine comminuted state which is not so fine, however, as to lose iodine excessively and depart from the original, known composition. Particles finer than 300 mesh have been found to be deficient in iodine content. Excessively fine particles are difficult to apply to the carrier electrode and may have a physical effect in increasing the resistivity of the selenium layer in the completed rectifier. There is a known, small, consistent percentage of loss of iodine from the selected particle sizes, compared to that originally used, so that the material to be pressed to the carrier electrode is of accurately known composition. Particles of larger than 80 mesh size are returned to the hammer mill for further reduction. Large particles tend to cause uneven distribution of the selenium on the carrier electrode.

The hammer mill operates in a very different fashion from most known forms of comminuting devices, which are generally effective not only to break up the material but additionally to work it mechanically and cause roughened particle surfaces, adherence of fine particles to the surfaces of granules of acceptable size, and also cause cold flow. The shearing cut of a common food chopper produces plastic, spongy selenium. Rubbing action in a mortar-and-pestle grinder, and other rubbing types of comminuters are capable of producing the type of particle that is sufficiently fine for pressing to the carrier electrode, yet such use materially increases the forward resistance of the resulting rectifier. Use of a mortar and pestle with hammer blows fractures and shatters the vitreous shot, and produces selenium particles of the desired physical properties. The hammer mill impels large particles against hardened surfaces. The vitreous selenium pulverized in a hammer mill is fractured, not mechanically worked and roughened.

The selected fine particles of selenium with controlled iodine content are next applied under heat and pressure to form a layer on a roughened nickel-plated aluminum carrier electrode, with approximately 500 pounds per square inch, at 115–120° C. for about 4 minutes, as illustrated in the final step of Fig. 1. This operation is followed by heat treatment as for 30 minutes at approximately 215° C. to produce the desired crystalline structure. The rectifiers thus initially processed have notable characteristics in respect to uniformity and low forward resistivity of the selenium layer, while retaining the desired high back resistivity. A completed rectifier having a selenium layer processed as described is shown in Fig. 2, including a counterelectrode that is duly applied to the selenium layer prepared in the manner described.

Reverting now to the manner of producing the pellets containing iodine (or other volatile doping constituent) it is desirable to prepare even the small charge of selenium granules by heating commercially pure selenium at 400–450° C. for five minutes or longer, then chilling as shot, and comminuting in a fracturing operation. Optionally the doped selenium that is ready for application to the carrier electrode may be used in forming pellets. With this precaution in preparing the selenium for pellets, the selenium that is added as part of the pellets to the molten selenium previously heated as indicated is of approximately the same purity and average molecule size as that of molten selenium.

The foregoing specification discloses several novel features in the preferred method of manufacturing selenium elements, in specific detailed terms. Various modifications, substitutions and departures from the illustrative process will occur to those skilled in the art, so that the appended claims should be allowed that broad interpretation that is consistent with the spirit and scope of the invention.

What is claimed is:

1. The method of manufacturing selenium rectifiers comprising the steps of heating selenium at 400–450° C. for about five minutes, doping the selenium by immersing a pellet having a vitreous selenium case of small average molecule size and a core of iodine in said selenium while agitating to cause thorough dispersion of the iodine in the selenium, dividing the molten iodine-doped selenium into drops, and chilling the drops abruptly to produce vitreous doped selenium shot fracturing the shot into particles, selecting and separating out the particles of 80–300 mesh size, and applying the selected particles to a carrier electrode under heat and pressure.

2. In the manufacture of asymmetrically conductive selenium elements, the method of preparing doped selenium for application to a carrier electrode, comprising the steps of forming a pellet of iodine encased in vitreous selenium particles of small average molecule size, immersing and agitating said pellet in a relatively great amount of molten selenium of high purity and of small average molecule size, dividing and chilling the iodine-doped molten selenium into vitreous shot, fracturing said shot into particles, and separating the particles of 80–300 mesh sizes.

3. In the manufacture of asymmetrically conductive devices, the method of preparing particles for application to an electrode comprising the steps of heating a quantity of selenium at 400–450° C. to reduce the average molecule size and to drive off volatile impurities, immersing and agitating a pellet containing a measured charge of iodine encased in vitreous selenium of small average molecule size, converting the molten doped selenium into vitreous shot by dividing it into drops and chilling, and fracturing the vitreous shot into particles of an average of 80–300 mesh sizes.

4. The method of manufacturing selenium elements comprising the steps of encasing a small charge of volatile doping constituent in a shell of vitreous selenium having small average molecule size, preheating a measured quantity of selenium to produce molten purified selenium of small average molecule size, adding said shell of vitreous selenium containing the doping constituent to the molten selenium, and chilling and subdividing the doped selenium in a manner to preserve the vitreous state.

5. The method of doping selenium in the manufacture of semiconductor elements which comprises the steps of preparing vitreous selenium in the form of particles of small average molecule size, cold-molding a pellet containing a relatively small measured charge of volatile doping constituent within a shell of said prepared selenium, and dispersing said doping constituent in a relatively large measured quantity of molten purified selenium while immersing and agitating said pellet in the molten selenium.

6. The method of manufacturing semiconductor elements, including the steps of encasing a small charge of a volatile doping constituent in a shell of a pure semiconductor material, melting a large charge of the same pure semiconductor material, and immersing the shell of semiconductor material containing the doping constituent to disperse the doping material thereof in the molten semiconductor material.

References Cited in the file of this patent

UNITED STATES PATENTS

| | | |
|---|---|---|
| 642,358 | Ott et al. | Jan. 30, 1900 |
| 1,181,901 | Lenz | May 2, 1916 |
| 1,742,324 | Snelling | Jan. 7, 1930 |
| 1,830,489 | Sproat | Nov. 3, 1931 |
| 2,137,316 | Van Geel | Nov. 22, 1938 |
| 2,216,769 | Drapeau | Oct. 8, 1940 |
| 2,227,827 | Dubar | Jan. 7, 1941 |
| 2,307,474 | Thompson | Jan. 5, 1943 |
| 2,461,089 | Smidth | Feb. 8, 1949 |
| 2,463,753 | Dekker | Mar. 8, 1949 |